US007802493B2

(12) United States Patent
Kubota et al.

(10) Patent No.: US 7,802,493 B2
(45) Date of Patent: Sep. 28, 2010

(54) CONNECTING ROD, INTERNAL COMBUSTION ENGINE, AUTOMOTIVE VEHICLE, AND PRODUCTION METHOD FOR CONNECTING ROD

(75) Inventors: Tsuyoshi Kubota, Shizuoka (JP); Hirotaka Kurita, Shizuoka (JP); Hiroshi Yamagata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 818 days.

(21) Appl. No.: 11/611,985

(22) Filed: Dec. 18, 2006

(65) Prior Publication Data
US 2007/0151409 A1    Jul. 5, 2007

(30) Foreign Application Priority Data
Dec. 20, 2005    (JP)    ............................. 2005-365746

(51) Int. Cl.
*F16C 7/00*    (2006.01)
(52) U.S. Cl. .................................................. 74/579 R
(58) Field of Classification Search ............... 74/579 R, 74/579 E
See application file for complete search history.

(56) References Cited
U.S. PATENT DOCUMENTS

| 5,865,364 | A | 2/1999 | Trask et al. |
| 6,244,495 | B1 | 6/2001 | Rapp et al. |
| 6,492,037 | B2 | 12/2002 | Shindo et al. |
| 6,688,512 | B2 | 2/2004 | Trask |
| 6,692,841 | B2 | 2/2004 | Shindo et al. |
| 2008/0271562 | A1* | 11/2008 | Yasuhara et al. .......... 74/579 E |

FOREIGN PATENT DOCUMENTS

| EP | 1 450 056 A2 | 8/2004 |
| GB | 2 172 690 A | 9/1986 |
| JP | 56-12080 A | 2/1981 |
| JP | 58-87238 A | 5/1983 |
| JP | 60-247432 A | 12/1985 |
| JP | 62-24019 A | 2/1987 |
| JP | 62-288713 A | 12/1987 |
| JP | 63199916 A * | 8/1988 |
| JP | 05071526 A * | 3/1993 |
| JP | 05-196030 A | 8/1993 |
| JP | 5-346112 A | 12/1993 |

(Continued)

OTHER PUBLICATIONS

Official communication issued in counterpart European Application No. 06025984.3, mailed on Apr. 6, 2009.

*Primary Examiner*—Vicky A Johnson
(74) *Attorney, Agent, or Firm*—Keating & Bennett, LLP

(57) ABSTRACT

A connecting rod includes a rod main body, a small end located at one end of the rod main body and a big end located at another end of the rod main body, the big end including a curved section which is curved so as to become narrower toward the rod main body. The big end is formed of a metal material whose composition is different from that of the rod main body, and is bonded to the rod main body. A joint between the big end and the rod main body is located closer to the small end than is an end of the curved section facing the rod main body.

13 Claims, 12 Drawing Sheets

FOREIGN PATENT DOCUMENTS

| | | |
|---|---|---|
| JP | 10-193141 A | 7/1998 |
| JP | 11-154435 A | 6/1999 |
| JP | 11-320132 A | 11/1999 |
| JP | 2000-141063 A | 5/2000 |
| JP | 2000-310329 A | 11/2000 |
| JP | 2001-252773 A | 9/2001 |
| JP | 2003-126968 A | 5/2003 |
| JP | 2003-200277 A | 7/2003 |

* cited by examiner

Motion
Load

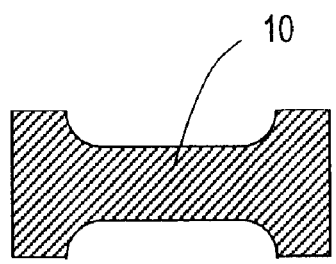
FIG.11A
D1
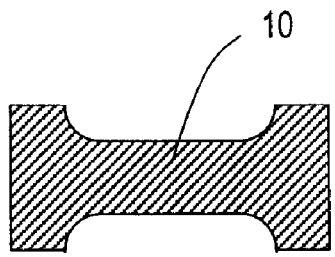
FIG.11B
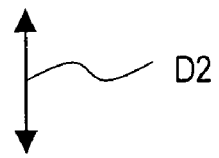
D2

CONNECTING ROD, INTERNAL COMBUSTION ENGINE, AUTOMOTIVE VEHICLE, AND PRODUCTION METHOD FOR CONNECTING ROD

BACKGROUND OF THE INVENTION

1. Field of the Invention

The present invention relates to a connecting rod and a production method thereof. Moreover, the present invention also relates to an internal combustion engine and an automotive vehicle including such a connecting rod.

2. Description of the Related Art

In an internal combustion engine of an automotive vehicle, a part which is called a connecting rod (or con rod) is used for linking a crankshaft to a piston. FIG. 16 shows a conventional connecting rod 401. The connecting rod 401 includes a bar-like rod main body 410, a small end 420 which is provided at one end of the rod main body 410, and a big end 430 which is provided at the other end of the rod main body 410.

The small end 420, which has a piston pin hole 425 for allowing a piston pin to extend therethrough, is connected to a piston via the piston pin. On the other hand, the big end 430, which has a crankpin hole 435 for allowing a crankpin to extend therethrough, is connected to a crankshaft via the crankpin.

The big end 430 is split into a rod portion 433 which continues from one end of the rod main body 410, and a cap portion 434 which is coupled to the rod portion 433 with bolts 440. Therefore, the connecting rod 401 shown in FIG. 16 is referred to as a split-type connecting rod. Other types of connecting rods are also known whose big end is not split.

Conventionally, steel has widely been used as a material for connecting rods. Recently, use of a titanium alloy has been disclosed (see, for example, Japanese Laid-Open Patent Publication No. 60-247432). Using a titanium alloy to reduce the weight of a connecting rod allows the weight of the crankshaft and other engine parts to be also reduced, whereby the weight of the entire engine can be further reduced. This makes possible an improved output power and reduced fuel consumption.

However, it has been found that using a titanium alloy as the material of a connecting rod may result in the following problems.

Requirements on the mechanical characteristics of a connecting rod differ from region to region. For example, the small end and rod main body of a connecting rod are required to have a high strength and a high toughness so as not to undergo fatigue failure or impact failure during use. On the other hand, the big end of a connecting rod is required to be such that the inner peripheral surface of the crankpin hole does not deform due to a rotary motion of a crankshaft, so that there is little friction against a crankpin. That is, the big end must have a high rigidity and a high elastic modulus so as not to deform during a high-speed drive.

If a titanium alloy whose elastic modulus is lower than that of steel is used as the material of a connecting rod, weight reduction may be achieved, but the rigidity of the big end will be insufficient. On the other hand, designing a connection rod to have a size for attaining sufficient rigidity will detract from the advantage of weight reduction.

Accordingly, the inventors have contemplated using different metal materials for different regions of a connecting rod. In a connecting rod which is formed by bonding together a plurality of members which are composed of metals of different compositions, desired mechanical characteristics can be conferred to different regions of the connecting rod. For example, a metal material which is light-weight and which has a good fatigue strength may used for the small end and the rod main body, whereas a metal material which has a high rigidity and a high elastic modulus may be used for the big end, whereby weight reduction can be achieved while ensuring rigidity of the big end.

However, the inventors have conducted detailed studies to find that adequate weight reduction may actually be difficult to achieve even with such a technique. A connecting rod transmits the explosive force from a piston to a crankshaft, and therefore is required to have a high strength. Hence, if a connecting rod is formed by bonding together a plurality of members, the joints will have a reduced strength, thus making it difficult to obtain a sufficient strength. On the other hand, if a thick connecting rod is built in order to increase the cross-sectional area at each such joint and compensate for the reduced strength, there will be a corresponding increase in its weight, which detracts from the purpose of using different metal materials.

SUMMARY OF THE INVENTION

In order to overcome the problems described above, preferred embodiments of the present invention provide a connecting rod which has good mechanical characteristics in each of its regions, and which also attains adequate weight reduction, as well as providing a production method thereof.

A connecting rod according to a preferred embodiment of the present invention is a connecting rod including a rod main body; a small end located at one end of the rod main body; and a big end located at another end of the rod main body, the big end including a curved section which is curved so as to become narrower toward the rod main body; wherein the big end is formed of a metal material whose composition is different from that of the rod main body, and is bonded to the rod main body, and a joint between the big end and the rod main body is located closer to the small end than is an end of the curved section facing the rod main body.

In a preferred embodiment, the rod main body is formed of a material whose specific gravity is smaller than that of the big end.

In another preferred embodiment, the big end and the rod main body are bonded together by friction welding.

In another preferred embodiment, the small end and the rod main body are formed of a material whose specific strength is higher than that of the big end.

In another preferred embodiment, the small end and the rod main body are formed of a titanium alloy, an aluminum alloy, or a magnesium alloy.

In another preferred embodiment, the small end and the rod main body are formed of maraging steel, alloy steel, or carbon steel.

In another preferred embodiment, the big end is formed of high-carbon steel, microalloyed steel, or sinter-forged material.

In another preferred embodiment, the big end is formed of an iron alloy, and the small end and the rod main body are formed of a titanium alloy.

In another preferred embodiment, an average carbon content in the big end from a surface to a depth of about 0.2 mm is less than about 0.3 mass %, and a distance from the end of the curved section facing the rod main body to the joint is about 3 mm or more.

In another preferred embodiment, an average carbon content in the big end from a surface to a depth of about 0.2 mm is no less than about 0.3 mass % and no more than about 0.5 mass %, and a distance from the end of the curved section facing the rod main body to the joint is about 5 mm or more.

In another preferred embodiment, an average carbon content in the big end from a surface to a depth of about 0.2 mm is more than about 0.5 mass %, and a distance from the end of the curved section facing the rod main body to the joint is about 7 mm or more.

An internal combustion engine according to another preferred embodiment of the present invention includes a connecting rod having the aforementioned construction.

An automotive vehicle according to another preferred embodiment of the present invention includes a connecting rod having the aforementioned construction.

A production method for a connecting rod according to another preferred embodiment of the present invention is a production method for producing a connecting rod having a rod main body, a small end formed at one end of the rod main body, and a big end formed at another end of the rod main body, including a step of preparing a first member formed of a first metal material, a step of preparing a second member formed of a second metal material whose composition is different from that of the first metal material, and a step of bonding together the first member and the second member by linear friction welding.

In another preferred embodiment, the big end includes a curved section which is curved so as to become narrower toward the rod main body, and the bonding step is performed in such a manner that a joint between the first member and the second member is located closer to the small end than is an end of the curved section facing the rod main body.

In another preferred embodiment, the big end has a throughhole through which a crankpin is inserted, and the bonding step is performed in such a manner that the first member and the second member are rubbed against each other along a direction which is substantially perpendicular to a center axis direction of the throughhole and to a direction in which the rod main body extends.

In another preferred embodiment, the big end has a throughhole through which a crankpin is inserted, and the bonding step is performed in such a manner that the first member and the second member are rubbed against each other along a center axis direction of the throughhole.

In a connecting rod according to the preferred embodiments of the present invention, the small end and the rod main body are formed of a metal whose composition is different from that of the big end. Therefore, different mechanical characteristics can be achieved for the small end and the rod main body and for the big end, thus providing good mechanical characteristics for each region of the connecting rod.

Moreover, in a connecting rod according to a preferred embodiment of the present invention, a joint between the big end and the rod main body is located closer to the small end than is an end of the curved section of the big end facing the rod main body. Thus, in a connecting rod according to the present preferred embodiment, the joint is provided at a position which is offset from the end of the curved section where stress concentrates the most. Therefore there is less need for increasing the cross-sectional area of the joint in order to compensate for a reduced strength due to bonding. Therefore, an adequate weight reduction can be achieved while ensuring good mechanical characteristics.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 11A and 11B are diagrams for explaining preferred oscillation directions in a bonding step.

DETAILED DESCRIPTION OF PREFERRED EMBODIMENTS

Hereinafter, preferred embodiments of the present invention will be described with reference to the accompanying drawings. Note that the present invention is not to be limited to the preferred embodiments below.

Figure 1:
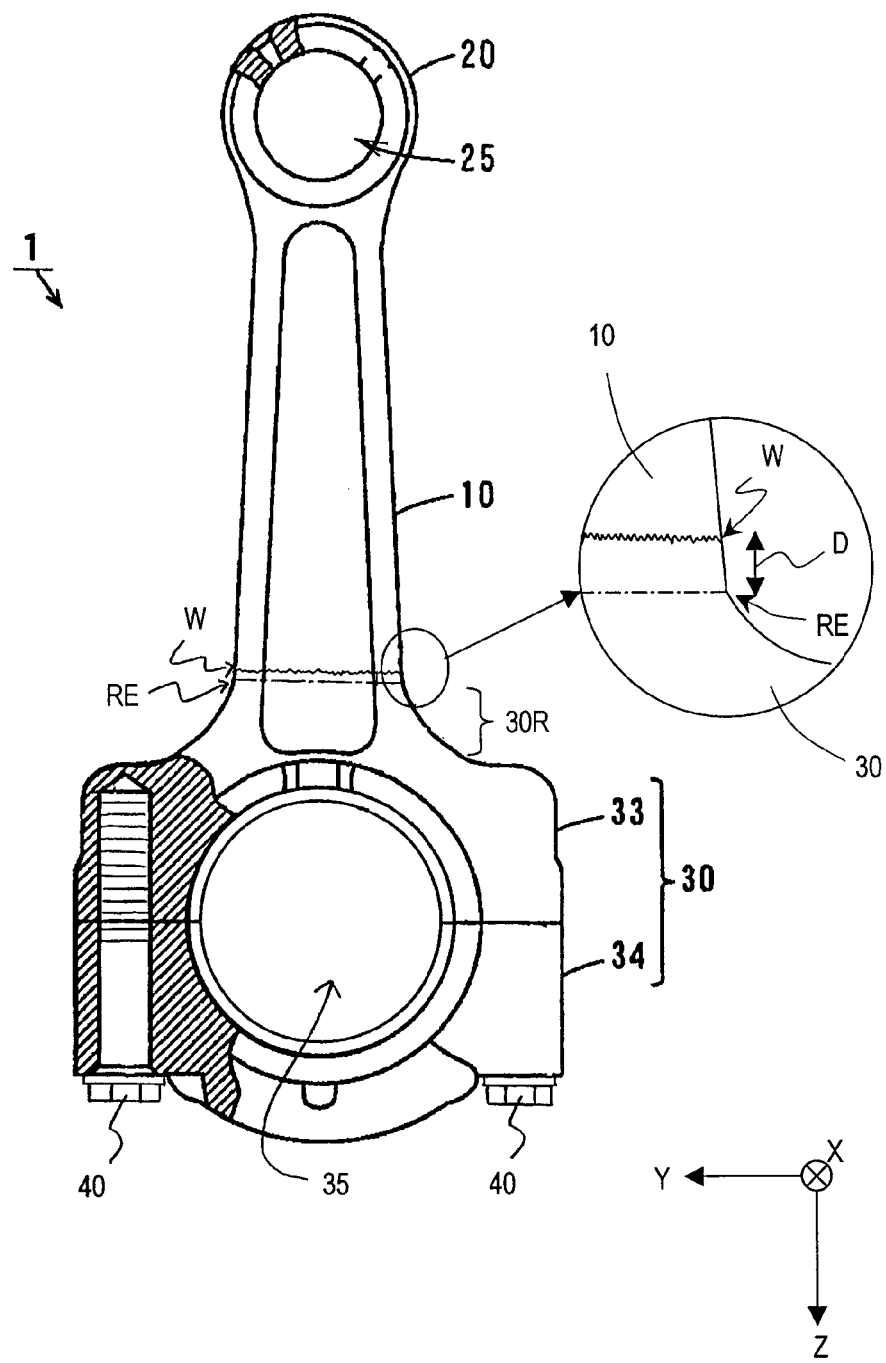
FIG. 1 is a plan view schematically showing a connecting rod according to a preferred embodiment of the present invention.

FIG. 1 shows a connecting rod 1 according to the present preferred embodiment. As shown in FIG. 1, the connecting rod 1 includes a bar-like rod main body 10, a small end 20 which is provided at one end of the rod main body 10, and a big end 30 which is provided at the other end of the rod main body 10.

The small end 20 has a throughhole (called a "piston pin hole") 25 for allowing a piston pin to extend therethrough. On the other hand, the big end 30 has a throughhole (called a "crankpin hole") 35 for allowing a crankpin to extend therethrough. The crankpin hole 35 typically has a larger diameter than that of the piston pin hole 25.

In the following descriptions, the direction in which the rod main body 10 extends will be referred to as the "longitudinal direction", and the direction of a center axis of the crankpin hole 35 will be referred to as the "axial direction". Moreover, a direction which is orthogonal to the longitudinal direction and the axial direction will be referred to as the "width direction". In the figures, the longitudinal direction is shown by arrow Z, the axial direction is shown by arrow X, and the width direction is shown by arrow Y.

Figure 2:
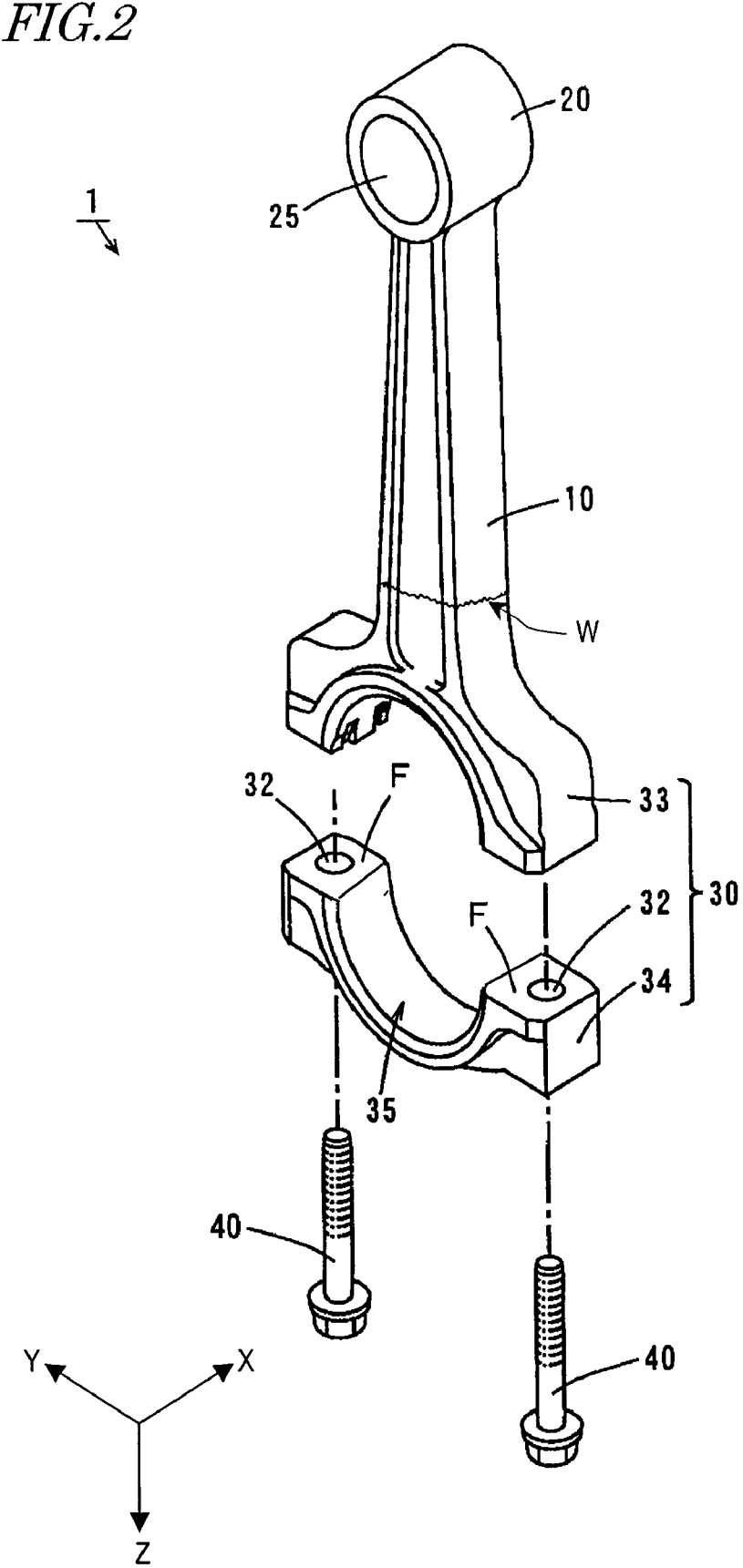
FIG. 2 is a perspective view schematically showing a connecting rod according to a preferred embodiment of the present invention.

As shown in FIG. 2, the big end 30 of the connecting rod 1 has been split into the rod portion 33, which continues to the other end of the rod main body 10; and the cap portion 34, which is coupled to the rod portion 33 via bolts 40 extending through bolt holes 32. It is preferable that the rod portion 33 and the cap portion 34 are split by a fracture split technique. A fracture split technique is a technique in which the rod portion 33 and the cap portion 34 are integrally formed and thereafter split through brittle fracture. With this technique, through brittle fracture, minute rugged features are formed on fractured surfaces F of the rod portion 33 and the cap portion 34 in a complementary manner. The complementary rugged features which are present on the fractured surfaces F of the rod portion 33 and the cap portion 34 enable accurate positioning of the rod portion 33 and the cap portion 34. As the rugged features on the fractured surface F fit one another, the rod portion 33 and the cap portion 34 are more firmly coupled to each other, whereby the rigidity of the entire big end 30 is improved.

The connecting rod 1 of the present preferred embodiment differs from a conventional connecting rod in that the big end 30 is formed of a metal whose composition is different from that of the small end 20 and the rod main body 10, and is bonded to the rod main body 10. FIGS. 1 and 2 show the joint between the big end 30 and the rod main body 10 at reference character W.

Fatigue strength is not such an important issue for the big end 30 of the connecting rod 1. Rather, the big end 30 is required to have a high rigidity and a high elastic modulus. In the case where the aforementioned fracture split technique is used, the big end 30 should also allow easy brittle fracture. On the other hand, the small end 20 and the rod main body 10 are required to have a high fatigue strength, rather than a high rigidity and a high elastic modulus. In conventional connecting rods, it has been difficult to satisfy all of the aforementioned preferred conditions because the entire connecting rod is integrally formed from the same material.

In the present preferred embodiment, since the big end 30 is formed of a metal whose composition is different from that of the small end 20 and the rod main body 10, good mechanical characteristics can be achieved in each region of the connecting rod 1. Specifically, by forming the big end 30 from a metal material which has a high rigidity and a high elastic modulus (and further allows easy fracture split), and forming the small end 20 and the rod main body 10 from a metal material which has a high fatigue strength, a preferred distribution (a distribution which was not available in any conventional connecting rod) can be conferred to the mechanical characteristics of the connecting rod 1. Furthermore, by forming the small end 20 and the rod main body 10 from a metal material whose specific gravity (i.e., density) is smaller than that of the big end 30, the weight of the entire connecting rod 1 can be reduced while ensuring rigidity of the big end 30. For example, by forming the big end 30 from an iron alloy and forming the small end 20 and the rod main body 10 from a titanium alloy, a connecting rod 1 which is light-weight and has good mechanical characteristics can be obtained.

The connecting rod 1 of the present preferred embodiment is further defined by the location of the joint W between the big end 30 and the rod main body 10. As shown in FIG. 1, the big end 30 includes a curved section 30R which is curved on either side so as to become narrower toward the rod main body 10 (i.e., which is hollowed toward the inside). The joint W is located closer to the small end 20 than is an end RE of the curved section 30R, the end RE being an end of the curved section 30R that is facing (adjacent to) the rod main body 10.

In order to maximize the weight reduction effect by using a metal material whose specific gravity is smaller than that of the big end 30 as the material of the small end 20 and the rod main body 10, it might seem preferable to perform bonding at the end RE of the curved section 30R (i.e., so that the end RE of the curved section 30R would coincide with the joint W). However, when a plurality of members are bonded together, their joint W will have a reduced strength. Therefore, if bonding were to be performed at the end RE of the curved section 30R, which is subjected to the greatest stress within the connecting rod 1, it would be necessary to increase the cross-sectional area of the joint W in order to compensate for the insufficient strength. This would result in an increased weight, thus hindering a desired weight reduction.

On the other hand, according to the present preferred embodiment, the joint W is provided at a position which is offset from the end RE of the curved section 30R, at which end RE stress concentrates the most. As a result, it is unnecessary to increase the cross-sectional area of the joint W in order to compensate for the decrease in strength which is caused by bonding. Therefore, an adequate weight reduction can be achieved while ensuring good mechanical characteristics.

Note that the cross-sectional area of the connecting rod 1 changes along a direction from the small end 20 to the big end 30 (longitudinal direction Z in FIG. 1), in such a manner that the cross-sectional area undergoes a constant increase in the rod main body 10 from the small end 20 toward the big end 30. Therefore, typically, the end RE of the curved section 30R is defined as a portion where the rate of increase of cross-sectional area changes from the aforementioned constant value (i.e., so as to become greater).

The bonding between the big end 30 and the rod main body 10 may be performed by various methods, but it is preferable to use friction welding. Friction welding is a technique in which members to be bonded are rapidly rubbed against each other so as to be softened by the frictional heat, while a pressure is concurrently applied to effect bonding. A fusion welding technique may also be used, but using a fusion welding technique for the bonding of different materials may result in brittle alloys or intermetallic compounds being formed. Friction welding can suppress formation of such brittle alloys and intermetallic compounds, and therefore can be used for a favorable bonding of various combinations of different materials. Although a method which utilizes an intermediary member (third member), e.g., welding or brazing, may also be used for the bonding, a friction welding technique will facilitate bonding of different metal materials with a high strength, as compared to any method which utilizes an intermediary member.

Figure 3A:
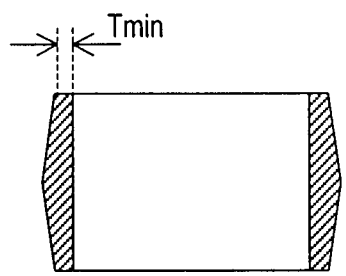
FIG. 3A is a diagram illustrating a minimum thickness of a small end.
Figure 3B:
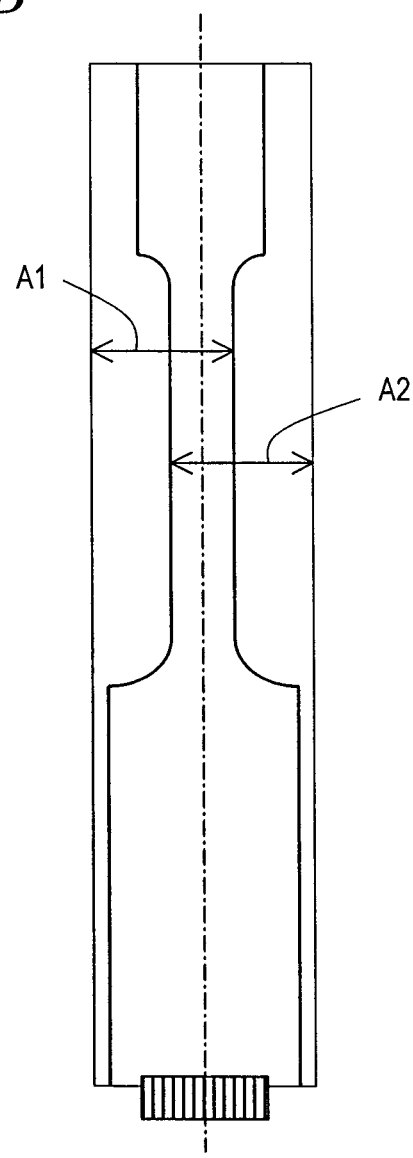
FIG. 3B is a view illustrating dimensions A1 and A2.

Moreover, with a friction welding technique, bonding can be performed with a good positional precision (e.g., a precision of about 0.05 mm), which will enable further weight reduction. A conventional connecting rod is integrally forged, in its entirety, and therefore has been difficult to form with a precise three-dimensional positional relationship between the piston pin hole and the crankpin hole. This has led to the need to increase the thickness of the connecting rod so as to account for such misalignment. For example, it has been necessary to increase the minimum thickness Tmin of the small end shown in FIG. 3A and dimensions A1 and A2 shown in FIG. 3B. On the other hand, friction welding helps to reduce such misalignment. Specifically, the conventional misalignment values of about 0.2 mm along the axial direction X and about 0.3 mm along the width direction Y and the longitudinal direction Z can be reduced to about 0.05 mm. Therefore, it is unnecessary to make the connecting rod 1 thick so as to account for such misalignment, whereby further weight reduction can be achieved. Weight reduction of the connecting rod 1 results in a reduced reciprocating weight, which will allow the weights of the crankshaft and balancer to also be reduced, thus enabling weight reduction of the internal combustion engine and the entire automotive vehicle.

Moreover, friction welding does not allow much of a gap at the joint W, and makes it unnecessary to use an intermediary member, thereby improving thermal conduction from the small end 20 to the big end 30. Furthermore, since no intermediary member is required, the facilities for performing the bonding step can be simplified, thus making it easy to achieve automation of the bonding step.

Figure 4:
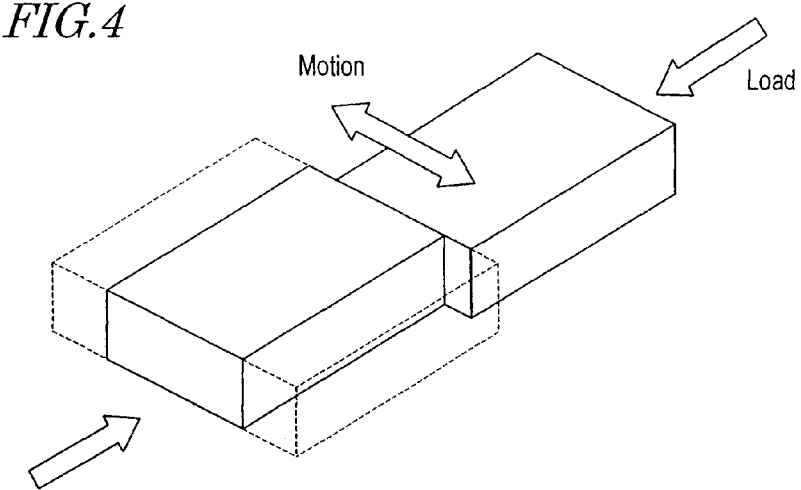
FIG. 4 is an illustration for explaining linear friction welding.

Friction welding is generally classified into rolling friction welding, in which one (or both) of the members to be bonded is allowed to rotate; and linear friction welding, in which one of the members to be bonded to is allowed to linearly reciprocate as shown in FIG. 4. Since the connecting rod 1 generally does not have a circular cross section, it is preferable to use linear friction welding.

Note that, even when bonding is performed by friction welding, the metallographical structure at the joint W will be changed, and thus the strength of the joint W will somewhat decrease. However, by offsetting the position of the joint W from the curved section end RE (where stress concentrates the most) as in the present preferred embodiment, there will be less need for increasing the cross-sectional area to compensate for such a reduced strength. Moreover, as the distance D from the end RE of the curved section 30R to the joint W (see FIG. 1) becomes longer, the curved section end RE becomes less likely to be affected by any change in the metallographical structure caused by bonding, thus minimizing a decrease in fatigue strength at the curved section end RE. Hereinafter, a preferred range of the distance D from the curved section end RE to the joint W will be specifically described with respect to cases where the big end 30 is preferably formed of an iron alloy and the small end 20 and the rod main body 10 are formed of a titanium alloy.

Table 1 shows the following data, where the distance D (mm) is varied: weight (g) of the entire connecting rod, Vickers hardness (HV) of the curved section end RE at a depth of about 0.1 mm, and fatigue strength (MPa) of the curved section end RE. Note that the data shown in Table 1 was obtained by using as the material of the big end 30, an iron alloy (steel) whose average carbon content from the surface to a depth of about 0.2 mm is less than 0.3 mass %, and as the material of the small end 20 and the rod main body 10, a titanium alloy whose composition is Ti-6Al-4V (i.e., containing about 6 mass % Al and about 4 mass % V).

TABLE 1 average carbon content in big end from surface to depth of 0.2 mm: <0.3 mass %

| distance from curved section end to joint (mm) | weight of connecting rod (g) | hardness of curved section end (HV) | fatigue strength of curved section end (MPa) | weight of connecting rod, with adjusted cross-sectional area of joint (g) | weight of connecting rod, when entirely formed of steel (g) |
|---|---|---|---|---|---|
| 1 | 266.0 | 630 | 756 | 278.5 | 338 |
| 3 | 267.0 | 720 | 864 | 268.9 | |
| 5 | 268.0 | 720 | 864 | 268.0 | |
| 7 | 268.9 | 720 | 864 | 268.9 | |
| 9 | 269.8 | 720 | 864 | 269.8 | |
| 11 | 270.6 | 720 | 864 | 270.6 | |

Firstly, looking at the weight of the connecting rod 1, it can be seen that the weight of the connecting rod 1 decreases as the distance D becomes shorter. This is because a greater portion is formed of a titanium alloy as the distance D becomes shorter.

However, looking at the hardness and fatigue strength of the curved section end RE, it can be seen that the curved section end RE has a low hardness and a low fatigue strength when the distance D is too short. This is because the curved section end RE is affected by a change in the metallographical structure of the joint W when the distance D is too short.

Table 1 also shows the weight (hereinafter "adjusted weight") of the connecting rod 1 when the cross-sectional area of the joint W is adjusted (or specifically, increased) so that a preferable fatigue strength is obtained at the curved section end RE. Looking at the adjusted weight, it can be seen that there is actually an increase in the weight when the distance D is too short.

Figure 5:
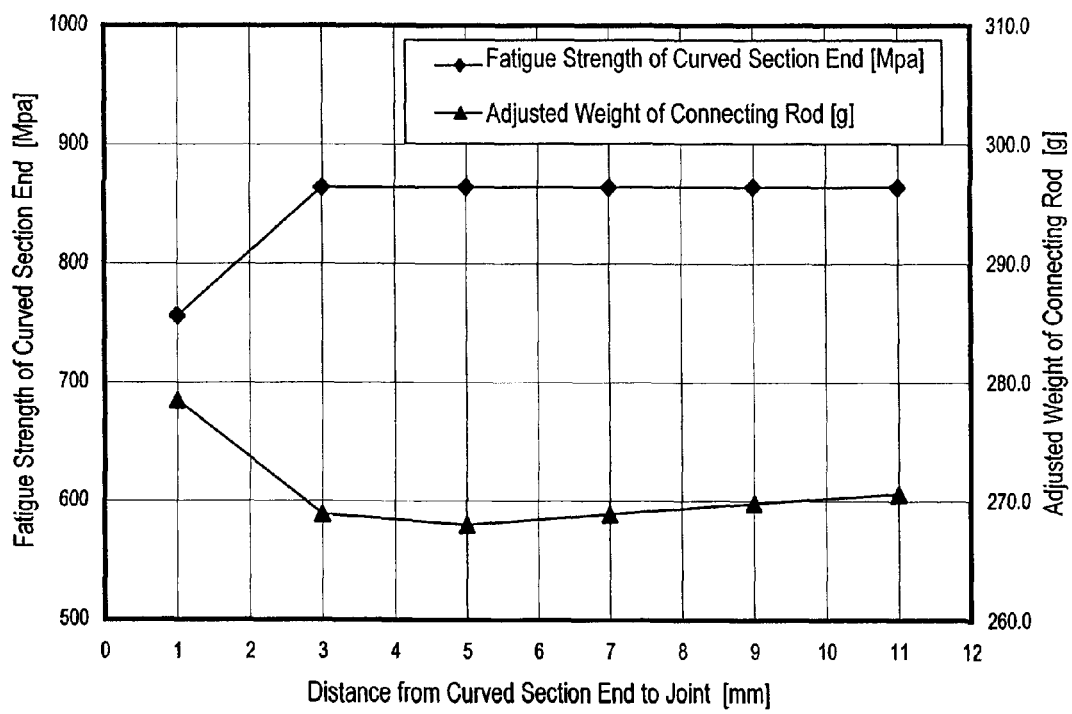
FIG. 5 is a graph showing a relationship between a distance from a curved section end to a joint, fatigue strength of the curved section end, and adjusted weight of a connecting rod.

FIG. 5 shows a relationship between the distance D from the curved section end RE to the joint W, fatigue strength of the curved section end RE, and adjusted weight of the connecting rod 1.

From FIG. 5, it can be seen that fatigue strength improves as the distance D becomes longer, and that the fatigue strength takes a virtually constant value when the distance D is about 3 mm or more. This means that, when the distance D is about 3 mm or longer, the curved section end RE is hardly affected by a change in the metallographical structure of the joint W. There is also a corresponding decrease in the adjusted weight as the distance D becomes longer, indicating that an adequate weight reduction effect is obtained when the distance D is about 3 mm or more. Since the weight of the connecting rod 1 when it is entirely formed of steel is 338 g as shown in Table 1, a weight reduction of about 20% can be obtained by setting the distance D to be about 3 mm or more in the illustrated example. Note that, as can also be seen from FIG. 5, the distance D may also be less than about 3 mm so long as it is sufficiently close to 3 mm (about 2.5 mm or more), whereby a practically sufficient weight reduction effect can be obtained.

Figure 6:
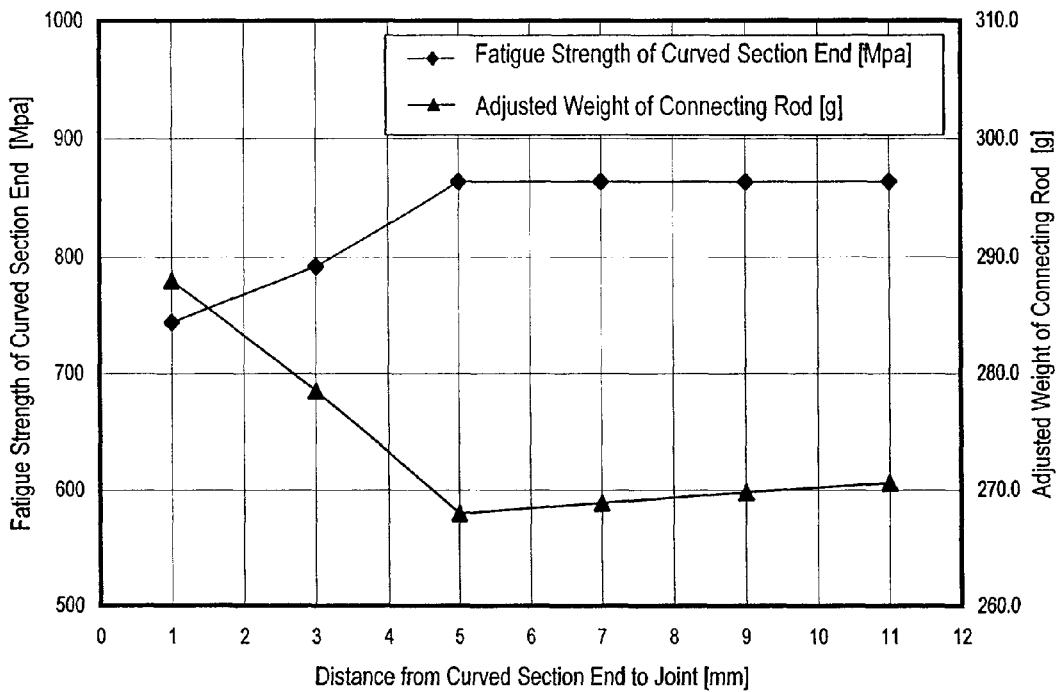
FIG. 6 is a graph showing a relationship between a distance from a curved section end to a joint, fatigue strength of the curved section end, and adjusted weight of a connecting rod.

Next, Table 2 and FIG. 6 show data in the case where the material of the big end 30 is an iron alloy (steel) whose average carbon content from the surface to a depth of about 0.2 mm is no less than about 0.3 mass % and no more than about 0.5 mass %. The material of the small end 20 and the rod main body 10 is the same as that in the connecting rod whose data is shown in Table 1 and FIG. 5.

TABLE 2 average carbon content in big end
from surface to depth of 0.2 mm: 0.3 mass % ≦ x ≦ 0.5 mass %

| distance from curved section end to joint (mm) | weight of connecting rod (g) | hardness of curved section end (HV) | fatigue strength of curved section end (MPa) | weight of connecting rod, with adjusted cross-sectional area of joint (g) | weight of connecting rod, when entirely formed of steel (g) |
|---|---|---|---|---|---|
| 1  | 266.0 | 620 | 744 | 288.0 | 338 |
| 3  | 267.0 | 660 | 792 | 278.5 |     |
| 5  | 268.0 | 720 | 864 | 268.0 |     |
| 7  | 268.9 | 720 | 864 | 268.9 |     |
| 9  | 269.8 | 720 | 864 | 269.8 |     |
| 11 | 270.6 | 720 | 864 | 270.6 |     |

From Table 2 and FIG. 6, it can be seen that fatigue strength improves as the distance D becomes longer, and that the fatigue strength takes a virtually constant value when the distance D is about 5 mm or more. It can also be seen that the adjusted weight decreases as the distance D increases, indicating that an adequate weight reduction effect is obtained when the distance D is about 5 mm or more. Therefore, in this case, the curved section end RE acquires a sufficiently high fatigue strength when the distance D from the curved section end RE to the joint W is 5 mm or more, whereby an adequate weight reduction can be achieved. Note that, as can also be seen from FIG. 6, the distance D may also be less than 5 mm so long as it is sufficiently close to 5 mm (about 4.5 mm or more), whereby a practically sufficient weight reduction effect can be obtained.

Figure 7:
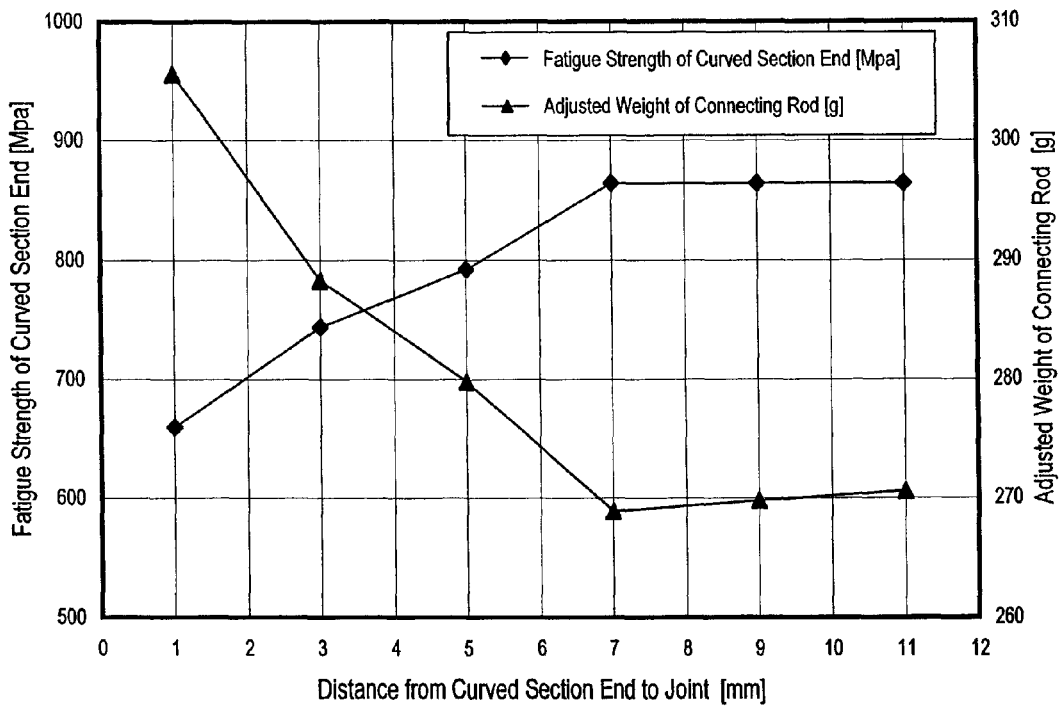
FIG. 7 is a graph showing a relationship between a distance from a curved section end to a joint, fatigue strength of the curved section end, and adjusted weight of a connecting rod.

Next, Table 3 and FIG. 7 show data in the case where the material of the big end 30 is an iron alloy (steel) whose average carbon content from the surface to a depth of about 0.2 mm is more than about 0.5 mass %. The material of the small end 20 and the rod main body 10 is the same as that in the connecting rod whose data is shown in Table 1 and FIG. 5.

TABLE 3 average carbon content in big end
from surface to depth of 0.2 mm: >0.5 mass %

| distance from curved section end to joint (mm) | weight of connecting rod (g) | hardness of curved section end (HV) | fatigue strength of curved section end (MPa) | weight of connecting rod, with adjusted cross-sectional area of joint (g) | weight of connecting rod, when entirely formed of steel (g) |
|---|---|---|---|---|---|
| 1  | 266.0 | 550 | 660 | 305.6 | 338 |
| 3  | 267.0 | 620 | 744 | 288.3 |     |
| 5  | 268.0 | 660 | 792 | 279.8 |     |
| 7  | 268.9 | 720 | 864 | 268.9 |     |
| 9  | 269.8 | 720 | 864 | 269.8 |     |
| 11 | 270.6 | 720 | 864 | 270.6 |     |

From Table 3 and FIG. 7, it can be seen that fatigue strength improves as the distance D becomes longer, and that the fatigue strength takes a virtually constant value when the distance D is about 7 mm or more. It can also be seen that the adjusted weight decreases as the distance D increases, indicating that an adequate weight reduction effect is obtained when the distance D is about 7 mm or more. Therefore, in this case, the curved section end RE acquires a sufficiently high fatigue strength when the distance D from the curved section end RE to the joint W is about 7 mm or more, whereby an adequate weight reduction can be achieved. Note that, as can also be seen from FIG. 7, the distance D may also be less than about 7 mm so long as it is sufficiently close to 7 mm (about 6.5 mm or more), whereby a practically sufficient weight reduction effect can be obtained.

As specifically described in Tables 1 to 3 and FIGS. 5 to 7, the connecting rod 1 according to the above-mentioned preferred embodiments provides an unexpected effect such that, by offsetting the joint W toward the small end 20, the weight of the connecting rod 1 can be conversely reduced.

Note that there is no particular upper limit to the distance D in each case. However, if the distance D is too long, the portion which is formed of a titanium alloy will become smaller, thus resulting in an extra increase in weight. Therefore, it is preferable that the distance D is about 10 mm or less.

Next, a production method for the connecting rod 1 according to another preferred embodiment will be described.

Figure 8A:
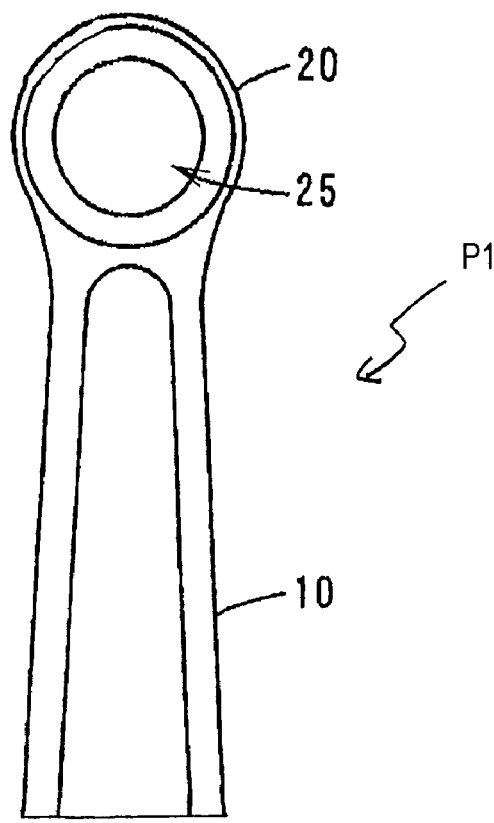
FIGS. 8A and 8B are plan views schematically showing a first member and a second member which are prepared in a production method for a connecting rod according to another preferred embodiment of the present invention.
Figure 8B:
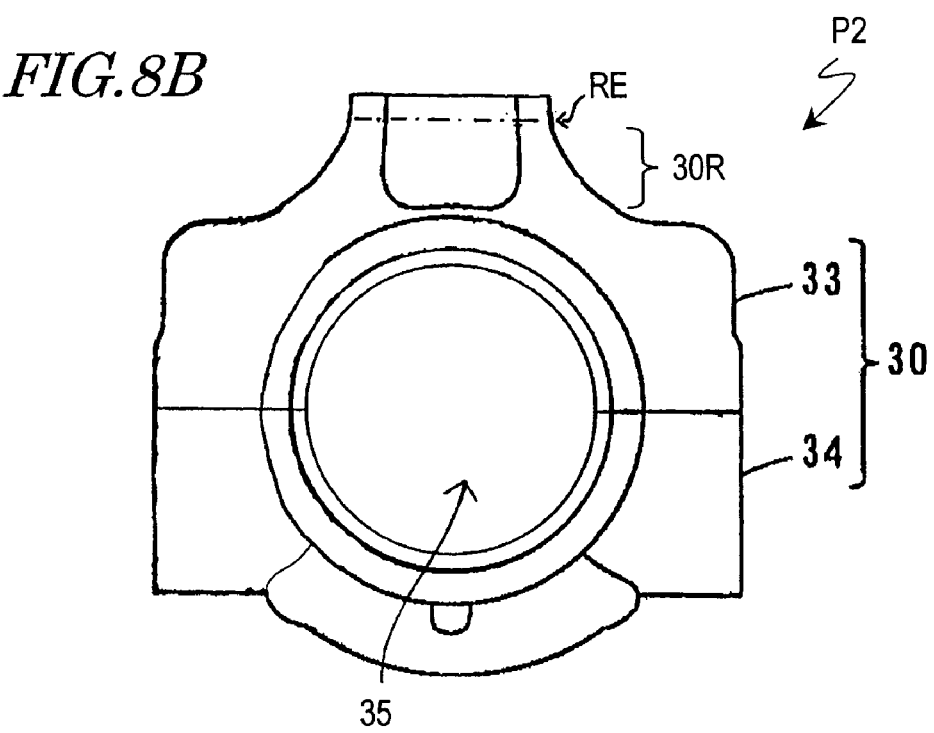

First, as shown in FIG. 8A, a first member P1 is prepared which is formed of a titanium alloy and includes the small end 20 and the rod main body 10. In addition, as shown in FIG. 8B, a second member P2 is prepared which is formed of an iron alloy and includes the big end 30. The first member P1 and the second member P2 can be formed by various known techniques including a forging step, a machining step, a heat treatment step, and the like.

Figure 9:
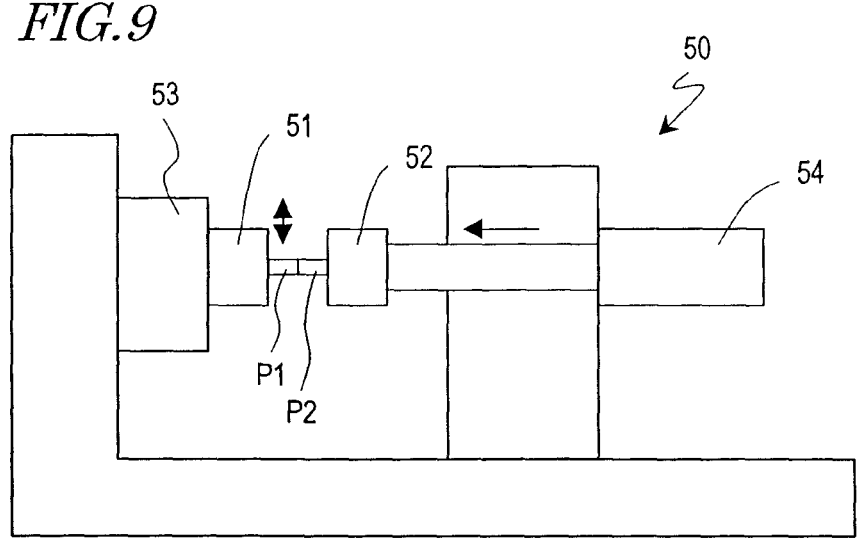
FIG. 9 is a diagram schematically showing a friction welding apparatus with which to perform linear friction welding.

Next, the first member P1 and the second member P2 which have been prepared are bonded together by linear friction welding. FIG. 9 shows a friction welding apparatus 50 with which to perform linear friction welding.

The friction welding apparatus 50 includes a first holder 51 for holding the first member P1, a second holder 52 for holding the second member P2, an actuator 53 which is linked to the first holder 51, and a hydraulic cylinder 54 which is linked to the second holder 52. As the actuator 53, a hydraulic servo type or electric motor type may be used, for example. While causing the first member P1 to linearly reciprocate with the actuator 53, the second member P2 is pressed against the first member P1 by using the hydraulic cylinder 54. Thus, friction welding is performed, whereby the first member P1 and the second member P2 are bonded together. This bonding step is performed in such a manner that the joint W between the first member P1 and the second member P2 is located closer to the small end 20 than is the end RE (facing the rod main body 10) of the curved section 30R. Burrs are cut off the joint W after the bonding, whereby the connecting rod 1 is finished.

Figure 10:
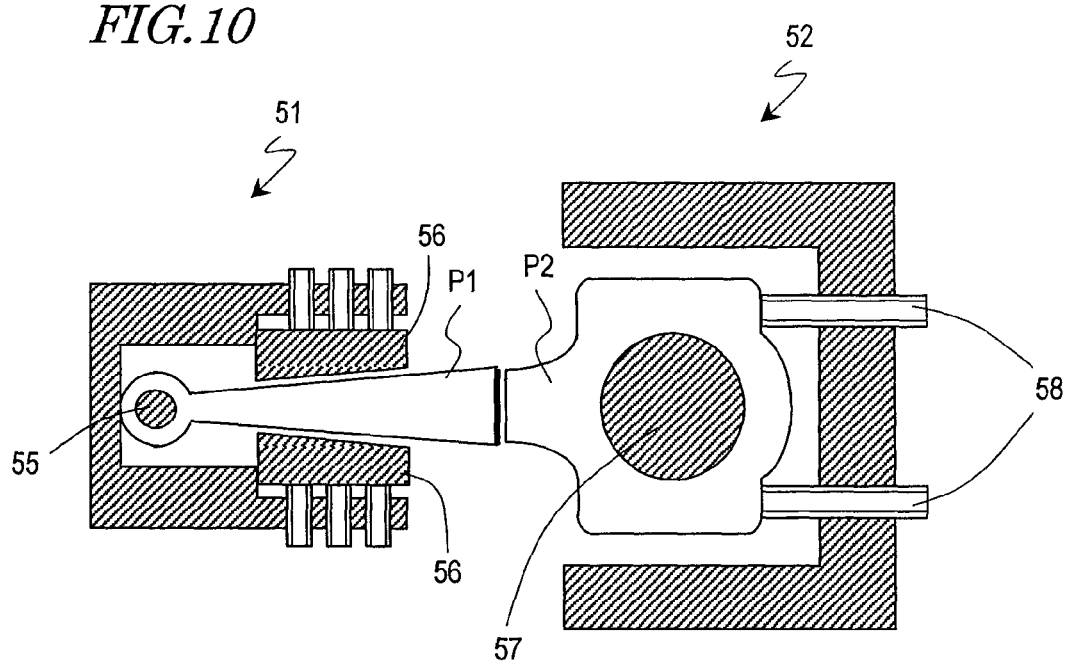
FIG. 10 is a schematic illustration of a first holder and a second holder which are included in a friction welding apparatus.

FIG. 10 shows exemplary first and second holders 51 and 52. The first holder 51 shown in FIG. 10 firmly holds the first member P1 with a pin 55 which is inserted through the piston pin hole 25 and a clamp 56 which clamps the rod main body 10 on both sides. The second holder 52 shown in FIG. 10 firmly holds the second member P2 with a pin 57 which is inserted through the crankpin hole 35 and bolts 58 which are inserted in bolt holes of the big end 30.

Now, preferred oscillation directions of the first member P1 in the bonding step will be described with reference to FIGS. 11A and 11B. FIGS. 11A and 11B are diagrams showing a cross section of the rod main body 10 and preferred oscillation directions.

Preferably, the bonding step is performed in such a manner that the first member P1 and the second member P2 are rubbed against each other along the width direction D1 of the connecting rod 1 (corresponding to the direction Y in FIG. 1), as shown in FIG. 11A. Since the width direction D1 is the direction along which the highest moment occurs in the plane which is parallel to the joint surface (i.e., having the highest rigidity), allowing the first member P1 to oscillate along the width direction D1 helps to reduce elastic deformation and plastic deformation during bonding. As a result, the amplitude which is required during bonding can be decreased, and the bonding precision can be improved.

Alternatively, as shown in FIG. 11B, it is also preferable to perform the bonding step in such a manner that the first member P1 and the second member P2 are rubbed against each other along the axial direction D2 (corresponding to the direction X in FIG. 1). Since the axial direction D2 is the direction along which the lowest moment occurs in the plane which is parallel to the joint surface (i.e., having the lowest rigidity), allowing the first member P1 to oscillate along the axial direction D2 makes it easier for the members to elastically deform during bonding. Thus, the joint surfaces can be better brought together, thus reducing the gap at the joint W. As a result, the bonding strength can be improved.

The selection as to which one of the width direction D1 or the axial direction D2 the first member P1 should oscillate can be made depending on the shapes and materials of the members near the joint W, the required performance (e.g., which one of bonding precision or bonding strength is regarded as important), and the like.

Note that, although the production method has been described with respect to an exemplary case where the first member P1 is allowed to oscillate, the second member P2 may be allowed to oscillate instead of the first member P1.

Next, preferred cross-sectional shapes near the joint W will be described with reference to FIGS. 12A, 12B, 13A, and 13B.

Figure 12A:
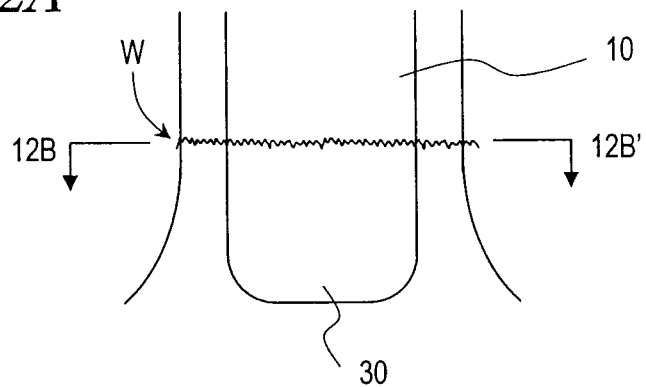
FIG. 12A is a plan view showing the area of a joint in a connecting rod.
Figure 12B:
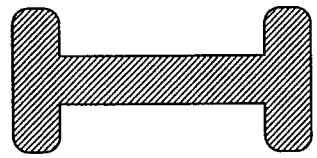
FIG. 12B is a cross-sectional view taken along line 12B-12B' in FIG. 12A.
Figure 13A:
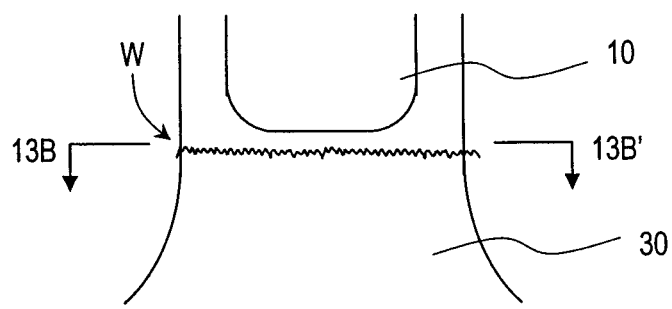
FIG. 13A is a plan view showing the area of a joint in a connecting rod.
Figure 13B:
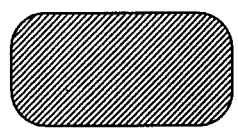
FIG. 13B is a cross-sectional view taken along line 13B-13B' in FIG. 13A.

As shown in FIGS. 12A and 12B, if an H-shaped cross-sectional shape is used at the joint W, weight reduction can be ensured without decreasing the buckling strength (cross-sectional moment). Moreover, as shown in FIGS. 13A and 13B, if a generally rectangular cross-sectional shape is used at the joint W, the area of the joint surface can be increased without decreasing the buckling strength (cross-sectional moment), and therefore the bonding strength can be improved.

Although the present preferred embodiment illustrates an example where the small end 20 and the rod main body 10 are formed of a titanium alloy and the big end 30 is preferably formed of an iron alloy (steel), the present invention is not limited thereto.

It is preferable that the small end 20 and the rod main body 10 are formed of a titanium alloy, an aluminum alloy, or a magnesium alloy, for example. Since these metal materials have a high specific strength, it becomes possible to reduce the weight of the connecting rod 1 by using such metal materials.

In a conventional connecting rod, in the case where the small end and the rod main body are formed of any of such metal materials, the big end is also inevitably formed of that same metal material. Since the above metal materials are relatively expensive, use of such an expensive material in the big end will cause an increase in the production cost, even though the big end is not required to have a high specific strength. Moreover, in order to achieve the same level of mechanical strength by using any of the above metal materials, the big end will have to become large, which will again increase the production cost.

According to the preferred embodiments of the present invention, the big end 30 is formed of a metal material whose composition is different from that of the small end 20 and the rod main body 10. Therefore, by forming only the small end 20 and the rod main body 10 from a titanium alloy, an aluminum alloy, or a magnesium alloy, the amount of such an expensive metal material can be reduced from the conventional level corresponding to the amount which would have been used for the big end 30. As a result, the production cost can be reduced. Especially when the connecting rod is formed by forging, the material used for the small end has conventionally had a low production yield because of the requirement to match the size of the big end. The preferred embodiments of the present invention are also effective for improving the production yield.

In the case where the big end is formed of a titanium alloy, an aluminum alloy, or a magnesium alloy, sticking is likely to occur due to sliding against the crank side surfaces, thus resulting in the need to perform a surface treatment or use thrust washers. According to the preferred embodiments of the present invention, there is less need for a surface treatment or thrust washers.

Alternatively, it would also be preferable to form the small end 20 and the rod main body 10 from maraging steel, alloy steel, or carbon steel. Each of these metal materials has a high fatigue strength, and therefore can be suitably used as a material for the small end 20 and the rod main body 10.

In a conventional connecting rod, in the case where the small end and the rod main body are formed of any of such metal materials, the big end is also inevitably formed of that metal material. Since the above metal materials are difficult to be processed after a heat treatment, if any of such materials is used (although the big end is not required to have a high fatigue strength), it will be difficult to process the big end, in which a greater amount of material must be processed than in the small end.

According to the preferred embodiments of the present invention, by forming only the small end 20 and the rod main body 10 from maraging steel, alloy steel, or carbon steel, processing of the big end 30 can be facilitated. Moreover, since these metal materials are also relatively expensive, the production cost can be reduced because of not having to use such metal materials for the big end 30.

It is preferable that the big end 30 is formed of high-carbon steel, microalloyed steel, or a sinter-forged material, for example. These metal materials have a high elastic modulus and are brittle, and therefore facilitate fracture split.

In a conventional connecting rod, in the case where the big end is formed of any of such metal materials, the small end and the rod main body are also inevitably formed of that metal material. Since the above metal materials have a relatively low fatigue strength, fatigue failure will be a problem if the small end and the rod main body are formed of any of such metal materials.

According to the preferred embodiments of the present invention, by forming only the big end 30 from high-carbon steel, microalloyed steel, or a sinter-forged material, it can be ensured that fatigue failure of the small end 20 and the rod main body 10 is not a problem. If the big end 30 is formed of the above metal materials which facilitate fracture split, the fracture split step can be simplified. Specifically, the cooling step can be omitted, formation of a fracture beginning trench can be simplified, and the output power of fracturing facilities can be reduced. Moreover, if the big end 30 is formed of any of the above metal materials having a high elastic modulus, deformation of the big end 30 can be minimized, so that sticking at the big end 30 can be prevented.

As exemplary combinations of metal materials having different compositions, the above-mentioned preferred embodiments have illustrated combinations of alloys whose base metals are different. However, possible combinations of metal materials are not limited thereto. Any combination including alloy materials having the same base metal may also be used. For example, a combination of iron alloys, e.g., SCM435 and maraging steel, may be used.

Although the above-mentioned preferred embodiment has illustrated friction welding as a preferable method for bonding together the big end 30 and the rod main body 10, it is also preferable to use an electron beam welding technique or a laser welding technique. With these methods, brittle alloys and/or intermetallic compounds (which lead to lower strength), are unlikely to occur because the amount of melting is small, and it is unnecessary to use any intermediary members (third members). Therefore, these methods can also be used to favorably bond together the big end 30 and the rod main body 10 which are formed of metal materials of different compositions. Moreover, use of an electron beam welding technique or a laser welding technique provides an advantage of further improved positional precision (e.g., up to about 0.01 mm) since the workpiece is not moved. There is also provided an advantage in that automation of the bonding step is easy.

Although the above-mentioned preferred embodiments have illustrated a split-type connecting rod, the present invention is also suitably used for a connecting rod of the type whose big end is not split.

Figure 14:
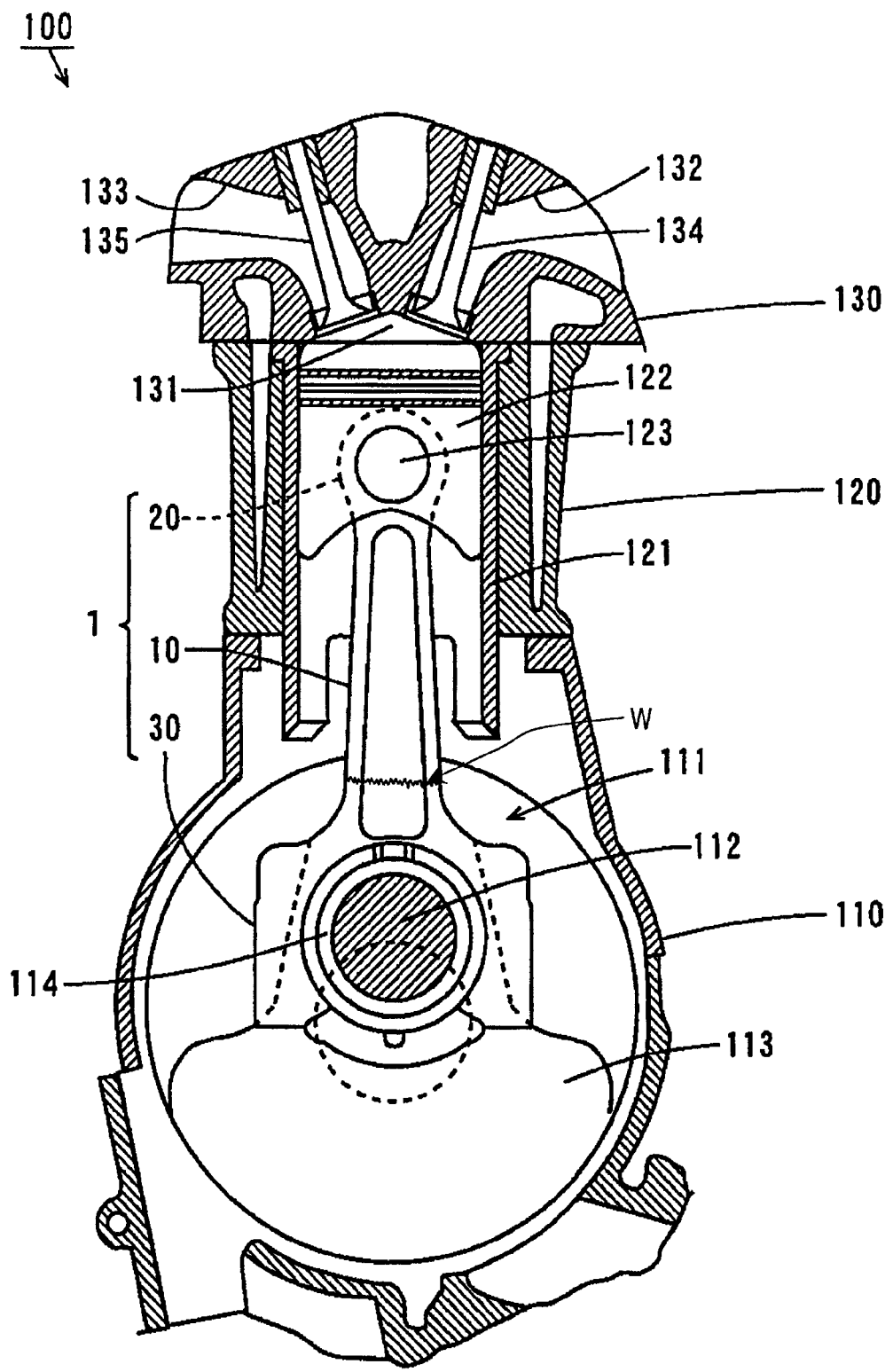
FIG. 14 is a cross-sectional view schematically showing an exemplary engine which incorporates a connecting rod according to a preferred embodiment of the present invention.

The connecting rod 1 according to the above-mentioned preferred embodiments can be broadly used in various types of internal combustion engines (engines) which are intended for automotive vehicles or other mechanical applications. FIG. 14 shows an example of an engine 100 which incorporates the connecting rod 1 of the above-mentioned preferred embodiments.

The engine 100 includes a crankcase 110, a cylinder block 120, and a cylinder head 130.

A crankshaft 111 is accommodated in the crankcase 110. The crankshaft 111 has a crankpin 112 and a crank web 113.

The cylinder block 120 is provided above the crankcase 110. A cylinder sleeve 121 having a cylindrical shape is fitted within the cylinder block 120, such that a piston 122 is allowed to reciprocate inside the cylinder sleeve 121.

The cylinder head 130 is provided above the cylinder block 120. In conjunction with the piston 122 and the cylinder sleeve 121 in the cylinder block 120, the cylinder head 130 defines a combustion chamber 131. The cylinder head 130 has an intake port 132 and an exhaust port 133. An intake valve 134 for supplying a mixture to the interior of the combustion chamber 131 is provided within the intake port 132, and an exhaust valve 135 for enabling evacuation of the combustion chamber 131 is provided within the exhaust port 133.

The piston 122 and the crankshaft 111 are linked via the connecting rod 1. Specifically, a piston pin 123 of the piston 122 is inserted in the throughhole (piston pin hole) of the small end 20 of the connecting rod 1, and the crankpin 112 of the crankshaft 111 is inserted in the throughhole (crankpin hole) of the big end 30, thus linking the piston 122 and the crankshaft 111 together. A bearing metal 114 is provided between the inner peripheral surface of the throughhole of the big end 30 and the crankpin 112. The bearing metal 114 is attached to the big end 30 by bearing attaching grooves.

Since the connecting rod 1 according to the preferred embodiments of the present embodiment can achieve an adequate weight reduction as already described above, the engine 100 can smoothly rise to a high revolution, and has a reduced fuel consumption.

Figure 15:
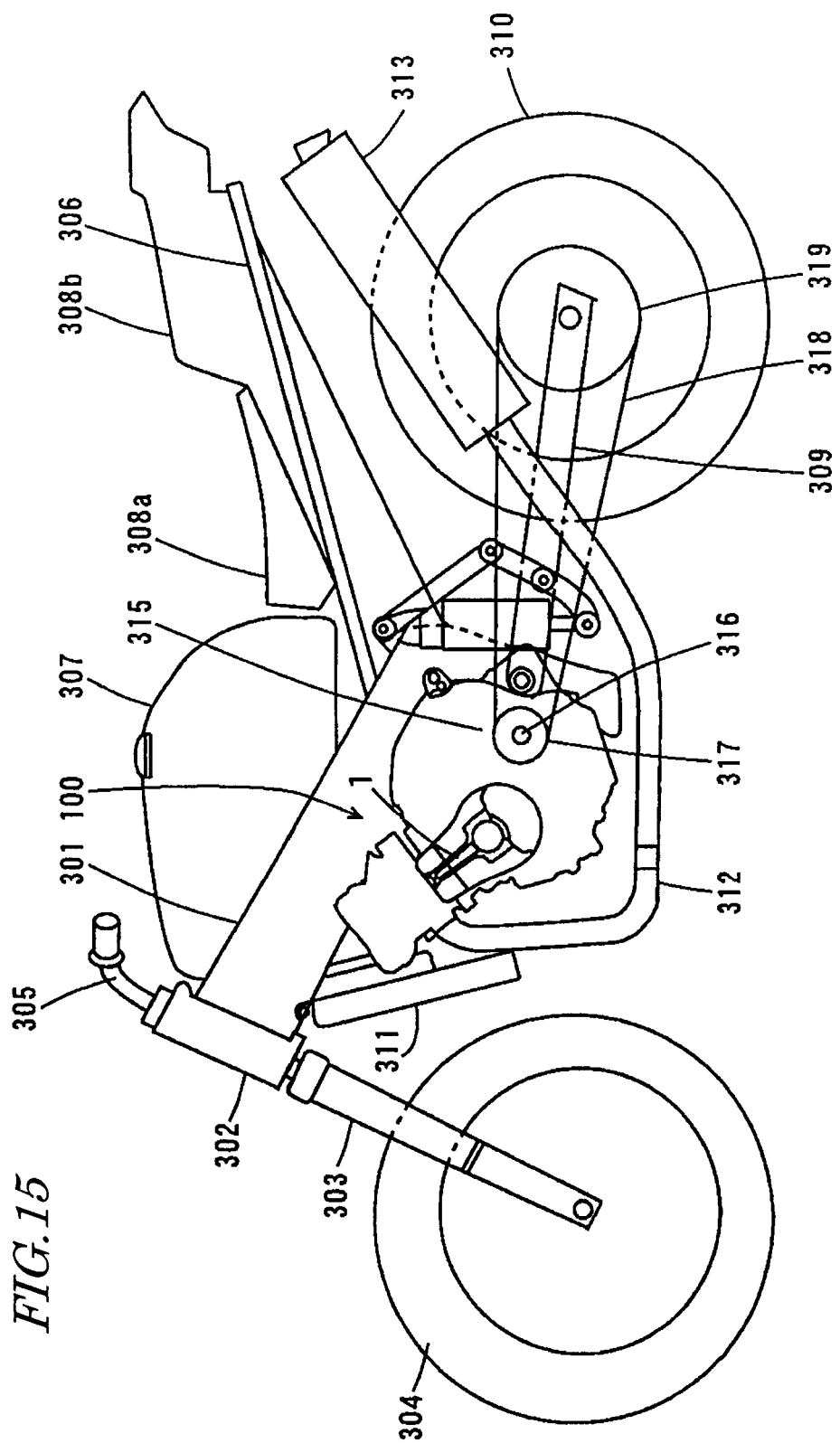
FIG. 15 is a cross-sectional view schematically showing a motorcycle which incorporates the engine shown in FIG. 14.
Figure 16:
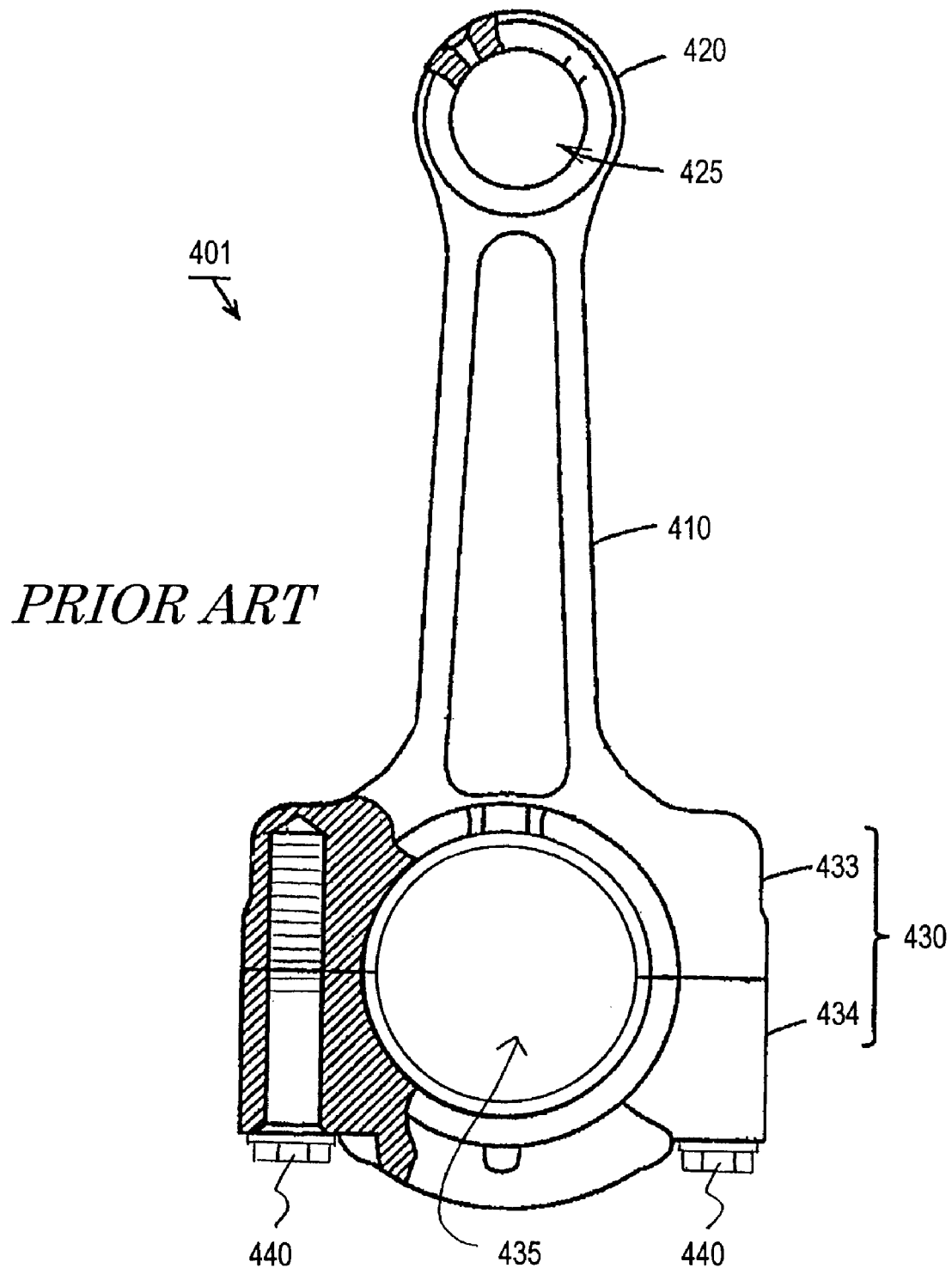
FIG. 16 is a plan view schematically showing a conventional split-type connecting rod.

FIG. 15 shows a motorcycle which incorporates the engine 100 shown in FIG. 14.

In the motorcycle shown in FIG. 15, a head pipe 302 is provided at the front end of a body frame 301. To the head pipe 302, handlebars 305 are attached at one end and a front fork 303 is attached at another end so as to be capable of swinging in the right-left direction of the vehicle. At the lower end of the front fork 303, a front wheel 304 is supported so as to be capable of rotating.

A seat rail 306 is attached at an upper portion of the rear end of the body frame 301 so as to extend in the rear direction. A fuel tank 307 is provided on the body frame 301, and a main seat 308a and a tandem seat 308b are provided on the seat rail 306.

Rear arms 309 extending in the rear direction are attached to the rear end of the body frame 301. At the rear end of the rear arms 309, a rear wheel 310 is supported so as to be capable of rotating.

At the central portion of the body frame 301, the engine 100 shown in FIG. 14 is mounted. The engine 100 incorporates the connecting rod 1 of the preferred embodiments of the present invention. A radiator 311 is provided in front of the engine 100. An exhaust pipe 312 is connected to an exhaust port of the engine 100, and a muffler 313 is attached to the rear end of the exhaust pipe 312.

A transmission 315 is linked to the engine 100. Driving sprockets 317 are attached on an output axis 316 of the transmission 315. The driving sprockets 317 are linked to rear wheel sprockets 319 of the rear wheel 310 via a chain 318. The transmission 315 and the chain 318 function as a transmitting mechanism for transmitting the motive power generated in the engine 100 to the driving wheel.

Since the motorcycle shown in FIG. 15 uses the engine 100, which incorporates the connecting rod 1 of the preferred embodiments of the present invention, excellent performance can be obtained.

According to the preferred embodiments of the present invention, a connecting rod which has good mechanical characteristics for each of its regions and which can achieve adequate weight reduction is provided.

A connecting rod according to the preferred embodiments of the present invention can be broadly used in various types of internal combustion engines (e.g., an engine for an automotive vehicle).

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2005-365746 filed on Dec. 20, 2005, the entire contents of which are hereby incorporated by reference.

What is claimed is:

1. A connecting rod comprising:
a rod main body, a small end located at one end of the rod main body and a big end located at another end of the rod main body, the big end including a curved section which is curved so as to become narrower toward the rod main body; wherein
the big end is formed of a metal material whose composition is different from that of the rod main body, and is bonded to the rod main body; and
a joint between the big end and the rod main body is located closer to the small end than is an end of the curved section facing the rod main body such that the joint is formed between the curved section of the big end and the small end.

2. The connecting rod of claim 1, wherein the rod main body is formed of a material whose specific gravity is smaller than that of the big end.

3. The connecting rod of claim 1, wherein the big end and the rod main body are bonded together by friction welding.

4. The connecting rod of claim 1, wherein the small end and the rod main body are formed of a material whose specific strength is higher than that of the big end.

5. The connecting rod of claim 1, wherein the small end and the rod main body are formed of a titanium alloy, an aluminum alloy, or a magnesium alloy.

6. The connecting rod of claim 1, wherein the small end and the rod main body are formed of maraging steel, alloy steel, or carbon steel.

7. The connecting rod of claim 1, wherein the big end is formed of high-carbon steel, microalloyed steel, or sinter-forged material.

8. The connecting rod of claim 1, wherein the big end is formed of an iron alloy, and the small end and the rod main body are formed of a titanium alloy.

9. The connecting rod of claim 8, wherein an average carbon content in the big end from a surface to a depth of about 0.2 mm is less than about 0.3 mass %, and a distance from the end of the curved section facing the rod main body to the joint is about 3 mm or more.

10. The connecting rod of claim 8, wherein an average carbon content in the big end from a surface to a depth of about 0.2 mm is no less than about 0.3 mass % and no more than about 0.5 mass %, and a distance from the end of the curved section facing the rod main body to the joint is about 5 mm or more.

11. The connecting rod of claim 8, wherein an average carbon content in the big end from a surface to a depth of about 0.2 mm is more than about 0.5 mass %, and a distance from the end of the curved section facing the rod main body to the joint is about 7 mm or more.

12. An internal combustion engine comprising the connecting rod of claim 1.

13. An automotive vehicle comprising the internal combustion engine of claim 12.

* * * * *